United States Patent [19]
Marlek

[11] Patent Number: 4,793,559
[45] Date of Patent: Dec. 27, 1988

[54] LIQUID CHEMICAL APPLICATOR

[76] Inventor: Edward Marlek, 8 Northfield Dr., Ft. Salonga, N.Y. 11768

[21] Appl. No.: 137,970

[22] Filed: Dec. 28, 1987

[51] Int. Cl.$^4$ .............................................. B05B 1/20
[52] U.S. Cl. .................................... 239/722; 239/166; 239/165; 239/176; 172/650; 172/640; 52/118; 280/47.34
[58] Field of Search ............... 239/159, 163, 164, 165, 239/166, 167, 168, 169, 722, 176, 172; 172/456, 640, 650, 818; 52/118; 280/43.1, 47.11, 47.13 R, 47.2, 47.34, 47.14

[56] References Cited

U.S. PATENT DOCUMENTS

| | | | |
|---|---|---|---|
| 1,512,454 | 10/1924 | Cade | 280/47.34 |
| 2,995,307 | 8/1961 | McMahon | 239/166 |
| 3,508,709 | 4/1970 | Small et al. | 239/754 |
| 4,011,914 | 3/1977 | Elmer | 239/168 |
| 4,011,994 | 3/1977 | Lenz | 239/168 |
| 4,241,794 | 12/1980 | Halterman, Jr. | 172/818 |
| 4,602,742 | 7/1986 | Penson | 239/172 |
| 4,643,358 | 2/1987 | Jackson | 239/166 |

Primary Examiner—Andres Kashnikow
Assistant Examiner—Chris Trainor
Attorney, Agent, or Firm—Michael I. Kroll

[57] ABSTRACT

An improved liquid chemical applicator is provided and consists of a mechanism that can activate a plurality of spray nozzles to apply a plurality of overlapping sprays of liquid chemical at a constant height, at a constant pressure and at a proper direction onto horizontal, vertical and angular surfaces to form a uniform coating thereon.

5 Claims, 2 Drawing Sheets

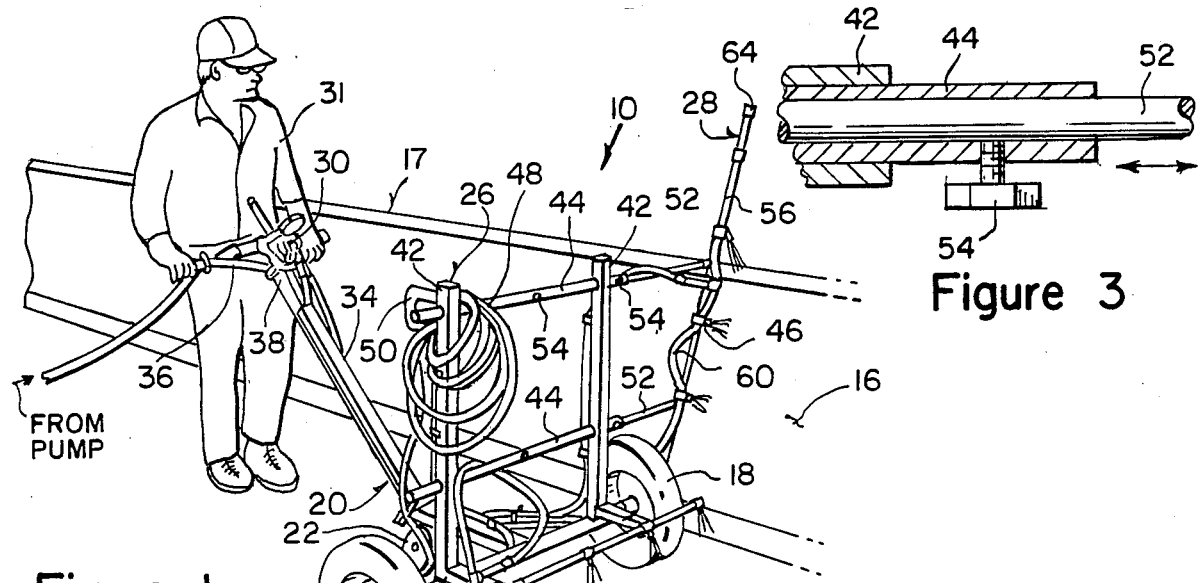
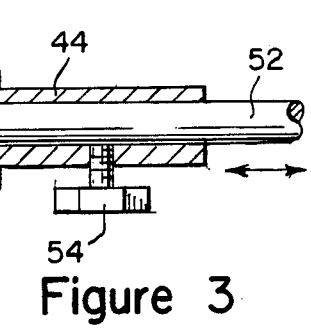
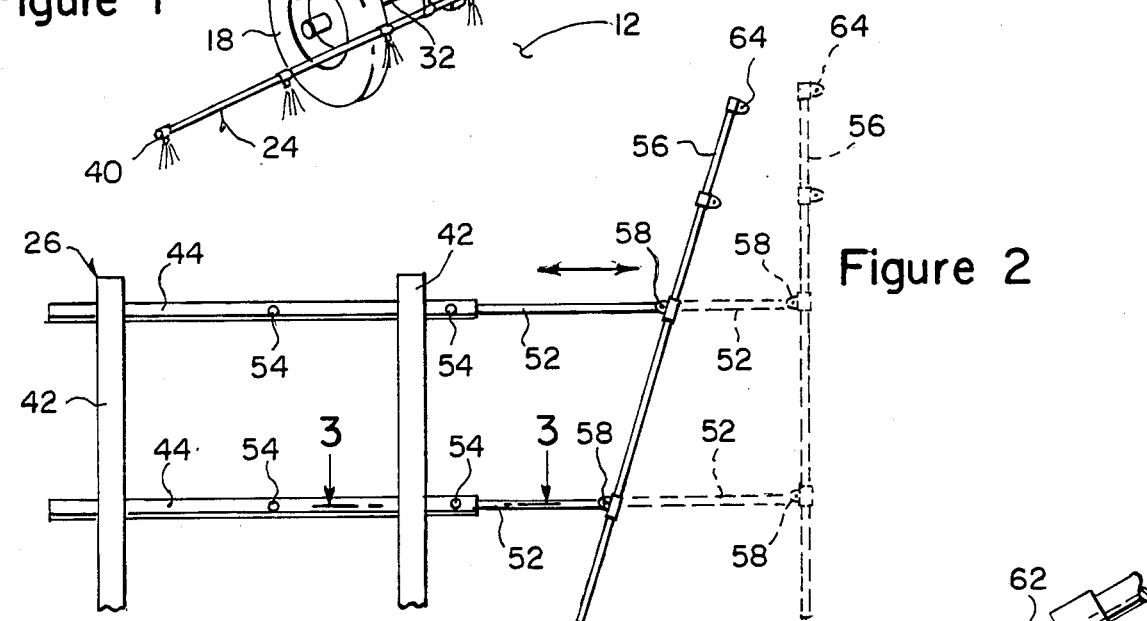
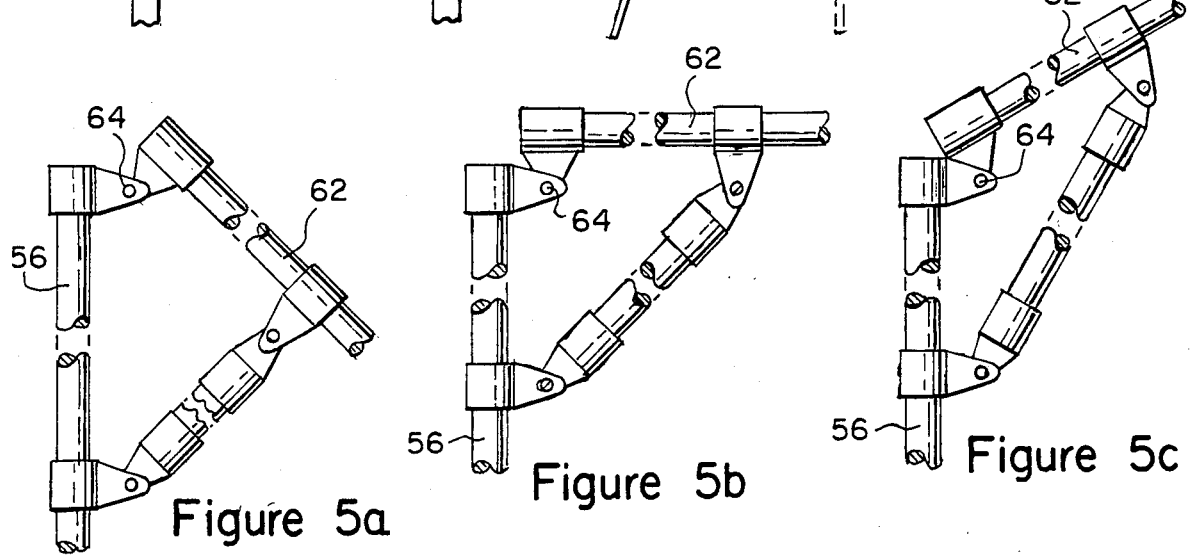

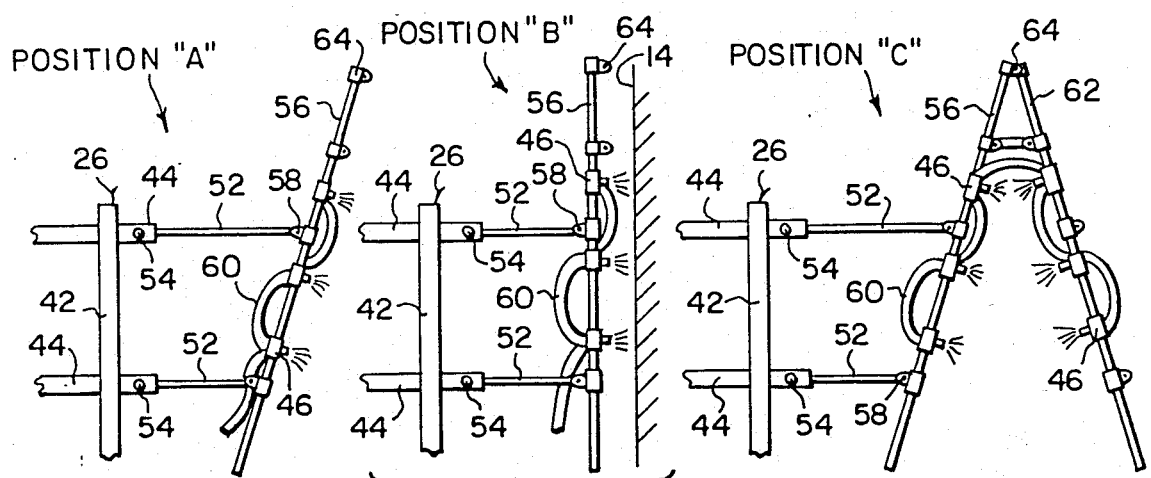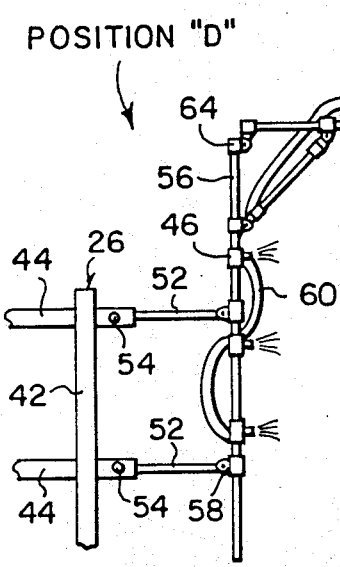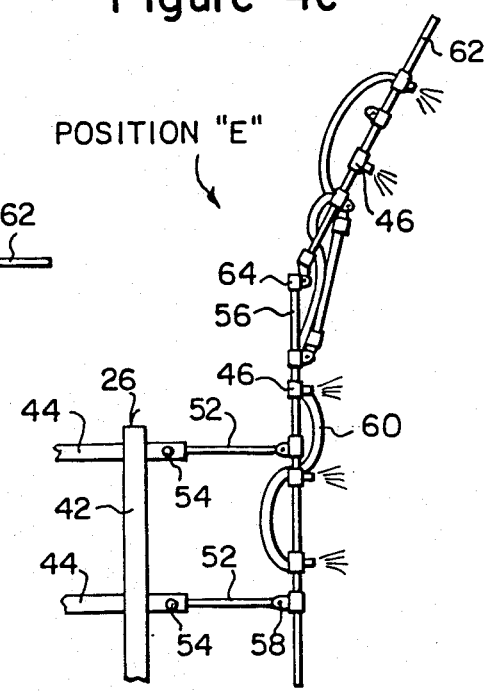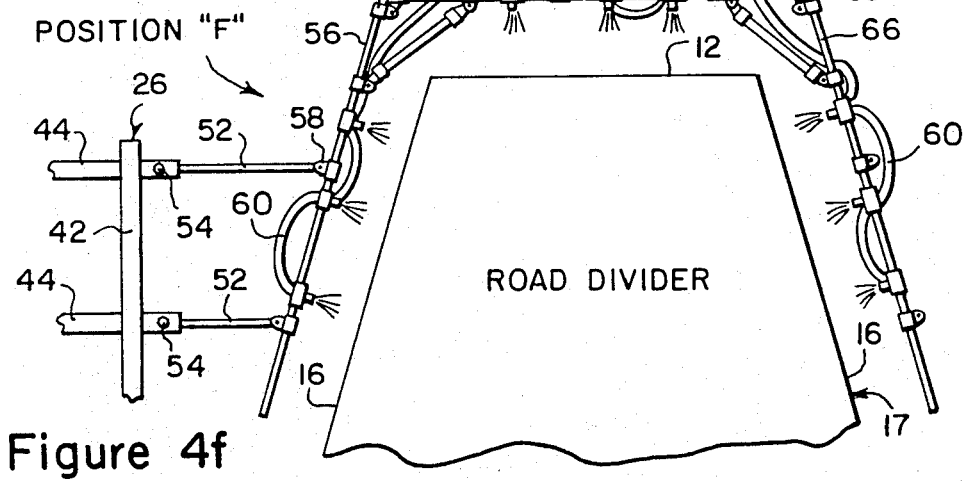

LIQUID CHEMICAL APPLICATOR

BACKGROUND OF THE INVENTION

1. Field of the Invention

The instant invention relates generally to spraying machines and more specifically it relates to an improved liquid chemical applicator.

2. Description of the Prior Art

Numerous spraying machines have been provided in prior art that are adapted to apply liquid materials to treat ground surfaces. For example, U.S. Pat. Nos. 3,118,607; 3,508,709 and 4,011,994 all are illustrative of such prior art. While these units may be suitable for the particular purpose to which they address, they would not be as suitable for the purposes of the present invention as heretofore described.

SUMMARY OF THE INVENTION

A primary object of the present invention is to provide an improved liquid chemical applicator that will overcome the shortcomings of the prior art devices.

Another object is to provide an improved liquid chemical applicator that will apply a uniform coating of pressurized liquid chemical onto horizontal, vertical and angular surfaces.

An additional object is to provide a improved liquid chemical applicator that is adjustable so as to conform to the various surfaces that the pressurized liquid chemical will be sprayed onto.

A further object is to provide an improved liquid chemical applicator that is simple and easy to use.

A still further object is to provide an improved liquid chemical applicator that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a perspective view of the invention in use.

FIG. 2 is a front view with parts broken away showing the vertical frame assembly in greater detail.

FIG. 3 is an enlarged cross sectional view taken along line 3—3 in FIG. 2.

FIGS. 4a to 4f are front views with parts broken away showing various position the second manifold assembly can take FIGS. 5a to 5c are detail views of the hinge portion between the first nozzle manifold rod and the second nozzle manifold rod in various positions to each other.

DETAILED DESCRIPTION OF THE PREFERRED EMBODIMENTS

Turning now descriptively to the drawings, in which similar reference characters denote similar elements throughout the several views, an improved liquid chemical applicator 10 is provided for treatment of horizontal, vertical and angular surfaces 12, 14 and 16. The applicator 10 consists of a pair of front wheels 18, a first frame assembly 20, a rear wheel 22, a first manifold assembly 24, a second frame assembly 26, a second manifold assembly 28 and a mechanism 30 for directing flow of pressurized liquid chemical by an operator 31 to the first manifold assembly 24 and the second manifold assembly 28. The pressurized liquid chemical comes from a pump (not shown) that is fluidly connected to a drum (not shown).

The first frame assembly 20 has an axle 32, an extension arm 34 and a control handle 36. The axle 32 extends between the front wheels 18. The extension arm 34 rearwardly projects transversely from center of the axle 32 and extends upwardly therefrom with the control handle 36 disposed at distal end 38 of the extension arm 34. The rear wheel 22 is rotatably connected to bottom of the extension arm 34 rearwardly of the front wheels 18 whereby the rear wheel 22 is manually steered by the operator 31 holding onto the control handle 36. The first manifold assembly 24 is mounted in front of and in alignment with the axle 32 and has a plurality of spaced apart first spray nozzles 40 thereon.

The second frame assembly 26 has a pair of vertical posts 42 and pair of horizontal hollow pipes 44. The vertical posts 42 are spaced apart and secured to the axle 32 of the first frame assembly 20 between the front wheels 18, with the hollow pipes 44 spaced apart and secured through the vertical posts 42, so that the hollow pipes 44 are above, behind and in alignment with the first manifold assembly 24. The second manifold assembly 28 is adjustably mounted within the hollow pipes 44 and has a plurality of spaced apart second spray nozzles 46 thereon.

When the flow directing mechanism 30 is activated the first and second spray nozzles 40 and 46 will apply a plurality of overlapping sprays of the liquid chemical at a constant height, at a constant pressure and at a proper direction onto the horizontal, vertical and angular surfaces 12, 14 and 16 such as a road median barrier 17 or the like to form a uniform coating thereon.

A first elongated hose 48 is fluidly connected to the flow directing mechanism 30. A spray wand 50 is connected to the first elongated hose 48 so that the flow directing mechanism 30 ca direct the liquid chemical to the spray wand 50 in which the spray wand can be held by the operator 31 to be manually used for spray touch ups and the like. The first elongated hose 48 and the spray wand 50 can be stored on the vertical posts 42 of the second frame assembly 26 when not being used.

The second manifold assembly 28 further includes a pair of horizontal rods 52, each of which is adjustably mounted, by set screws 54, within the hollow pipes 44 of the second manifold assembly. A first nozzle manifold rod 56 is pivotly attached at 58 to the horizontal rods 52 so that the first nozzle manifold rod 56 ca be positioned at various angles with respect to the second frame assembly 26. A second elongated hose 60 is fluidly connected between the second spray nozzles 46 and the flow directing mechanism 30 whereby the flow directing mechanism can direct the liquid chemical to the second spray nozzles 46.

The second frame assembly 26 can include a second nozzle manifold rod 62 pivotly attached at one end by pivot 64 to the first nozzle manifold rod 56 so that the second nozzle manifold rod 62 can be positioned at various angles with respect to the first nozzle manifold rod. A third nozzle manifold rod 66 can be pivotly attached at one end by pivot 68 to opposite end of the second nozzle manifold rod 62 so that the third nozzle manifold rod 66 can be positioned at various angles with respect to the second nozzle manifold rod.

LIST OF REFERENCE NUMBERS

10—improved liquid chemical applicator
12—horizontal surface
14—vertical surface
16—angular surface
17—road median barrier
18—front wheel
20—first frame assembly
22—rear wheel
24—first manifold assembly
26—second frame assembly
28—second manifold assembly
30—flow directing mechanism
31—operator
32—axle
34—extension arm
36—control handle
38—distal end of the extension arm
40—first spray nozzle
42—vertical post
44—horizontal hollow pipe
46—second spray nozzle
48—first elongated hose
50—spray wand
52—horizontal rod
54—set screw
56—first nozzle manifold rod
58—pivot
60—second elongated hose
62—second nozzle manifold rod
64—pivot
66—third nozzle manifold rod
68—pivot It will be understood that each of the elements described above, or two or more together, may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An improved liquid chemical applicator for treatment of horizontal, vertical and angular surfaces which comprises:
    (a) a pair of front wheels;
    (b) a first frame assembly having an axle, an extension arm and a control handle, the axle extending between said front wheels, the extension arm rearwardly projecting transversely from center of the axle and extending upwardly therefrom, with the control handle disposed at the distal end of the extension arm;
    (c) a rear wheel rotatably connected to the bottom of the extension arm rearwardly of said front wheels whereby said rear wheel is manually steered by an operator holding onto the control handle;
    (d) a first manifold assembly mounted in front of, and in parallel alignment with said axle, and having a plurality of spaced apart first spray nozzles thereon;
    (e) a second frame assembly having a pair of vertical posts and a pair of horizontal hollow pipes, the vertical posts being spaced apart and secured to the axle of said first frame assembly between said front wheels, with the hollow pipes spaced apart and horizontally secured through the vertical posts so that the hollow pipes are above, behind and in parallel alignment with said first manifold assembly;
    (f) a second manifold assembly adjustably mounted within the hollow pipes said second manifold assembly having a plurality of spaced apart second spray nozzles connected thereto; and
    (g) means for directing flow of pressurized liquid chemical by the operator to said first manifold assembly and said second manifold assembly so that the first and second spray nozzles will apply a plurality of overlapping sprays of the liquid chemical at a constant height, at a constant pressure and in a proper direction onto the horizontal vertical and angular surfaces to form a uniform coating thereon.

2. An improved liquid chemical applicator as recited in claim 1, further comprising:
    (a) a first elongated hose fluidly connected to said flow direction means; and
    (b) a spray wand connected to said first elongated hose so that said flow directing means can direct the liquid chemical to said spray wand whereas said spray wand can be held by the operator to be manually used for spray touch ups and the like, said first elongated hose and said spray wand being stored on the vertical posts of said second frame assembly when not being used.

3. An improved liquid chemical applicator as recited in claim 2, wherein said second manifold assembly further includes:
    (a) a pair of horizontal rods, each of which is adjustably mounted within the hollow pipes of said second manifold assembly;
    (b) a first nozzle manifold rod pivotly attached to said horizontal rods so that said first nozzle manifold rod can be positioned at various angles with respect to said second frame assembly and
    (c) a second elongated hose fluidly connected between the second spray nozzles and said flow directing means whereby said flow directing means can direct the liquid chemical to said second spray nozzles.

4. An improved liquid chemical applicator as recited in claim 3, wherein said second manifold assembly further includes a second nozzle manifold rod pivotly attached at one end to said first nozzle manifold rod so that said second nozzle manifold rod can be positioned at various angles with respect to said first nozzle manifold rod.

5. An improved liquid chemical applicator as recited in claim 4, wherein said second manifold assembly further includes a third nozzle manifold rod pivotly attached at one end to opposite end of said second nozzle manifold rod so that said third nozzle manifold rod can be positioned at various angles with respect to said second nozzle manifold rod.

* * * * *